Figure 1:
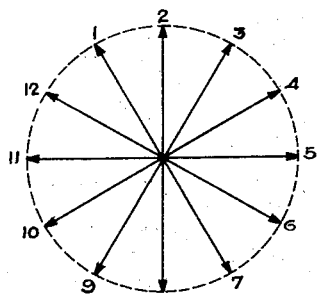

W. C. KORTHALS-ALTES.
MOTOR WINDING.
APPLICATION FILED MAR. 16, 1916.

1,267,232.

Patented May 21, 1918.

Inventor:
Willem C. Korthals-Altes,
by *[signature]*
His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

MOTOR-WINDING.

1,267,232.  Specification of Letters Patent.  Patented May 21, 1918.

Application filed March 16, 1916. Serial No. 84,707.

*To all whom it may concern:*

Be it known that I, WILLEM C. KORTHALS-ALTES, a subject of the Queen of the Netherlands, residing at Schenectady, in the county of Schenectady, State of New York, have invented certain new and useful Improvements in Motor-Windings, of which the following is a specification.

My present invention relates to polyphase alternating current motors and more particularly to an improved arrangement of the stator winding for three-phase motors.

It has been well understood that for the most satisfactory operation of a polyphase motor it is desirable that the excitation of the stator should approximate as closely as possible a pure sine wave. In order to secure a magnetomotive force which will produce a pure sine wave excitation it would be necessary theoretically, if the saturation of the iron is neglected, to have a winding with an infinite number of phases connected to a source of supply also having an infinite number of phases in such a way that at any instant the current in each phase differs in time phase from the current in any other phase by an angle which is equal to the distance by which the two phases are displaced in the stator structure. It is of course impossible to secure this condition in general practice as systems of distribution having more than two or three phases are not used commercially. Various rough approximations to this condition have been obtained with windings previously used which have been fairly satisfactory with a short circuited squirrel cage secondary, but in which the flux distribution however is so irregular as to cause troublesome sparking when a commutated secondary winding is employed. For example, if a three-phase, two-pole 60 degree stator winding is wound with full pitch and the stator has twelve teeth and twelve coils it may be shown that although the vector representing the magnetomotive force in each tooth is separated from the vector representing the magnetomotive force in the teeth on either side by an angle of 30°, the magnetomotive force in the different teeth is not equal but that it is greater in one-half of the total number of teeth than in the other half. This arrangement is also objectionable because of the fact that long end connections are required for the coils. The departure from a pure sine wave distribution in this case is equal to the difference between a hexagon and a circle. If the winding pitch is reduced to 50% it will be found that the magnetomotive forces in the different teeth are made approximately equal but that they are no longer displaced from each other by equal angles and as a result the flux distribution is more irregular than with the full pitch winding.

The object of my invention is to provide a motor winding in which some of the disadvantages pointed out above will be overcome and which when supplied with three-phase current will be the equivalent of a winding having twelve phases giving equal magnetomotive forces equally spaced from each other. A further object of my invention is to provide a winding which will be so arranged as to depart from a pure sine wave distribution of the flux only by the difference between a figure having twelve equal sides and a circle, with a smaller fractional pitch than that which must be used to secure the same result with the windings heretofore employed.

In carrying my invention into effect I divide the winding into twelve sections with an equal number of coils in each section, but the coils of half of the sections are wound with $n$ turns and the coils of the other half with $1.73n$ turns. I connect the sections whose coils have $n$ turns in Y and the sections whose coils have $1.73n$ turns in delta between the supply conductors.

Figure 3:
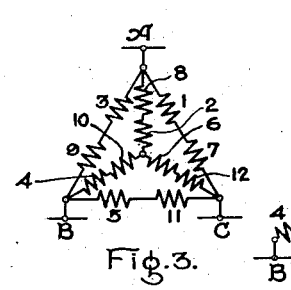
Figure 2:
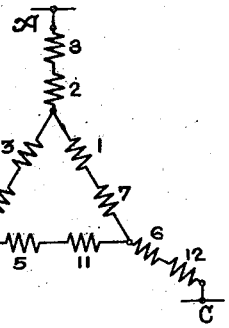

My invention will best be understood by reference to the following description taken in connection with the accompanying drawing in which Figure 1 shows the direction and instantaneous values of the magnetomotive force vectors in the teeth of a bipolar motor having twelve coils distributed along the circumference of the stator in twelve slots and connected in accordance with my invention; Figs. 2 and 3 show two ways in which the coils may be connected to the supply conductors to give the desired result; and Fig. 4 shows the end connections of the stator winding when the coils are connected as in Fig. 2.

For convenience in illustrating my invention I have shown a winding for a bipolar motor with twelve slots and twelve coils numbered 1, 2, 3, etc., so that each coil constitutes a section of the winding. The odd numbered coils have 1.73n turns and the even numbered coils have n turns. One side of coil 1 occupies the top of slot 1 and the other side occupies the bottom of slot 4, etc. Thus the winding pitch in this case is only fifty per cent. and the length of the end connections is less than with the usual three-phase winding. The coils are connected together as indicated diagrammatically in Fig. 2, and in greater detail in Fig. 4, the even numbered coils having n turns, each being connected in Y between the supply conductors A, B and C, and the odd numbered coils having 1.73n turns each being connected in delta. When connected as indicated in Figs. 2 and 4, the directions and instantaneous values of the magnetomotive force vectors in the different sections will be as shown in Fig. 1, that is, there will be a magnetizing current in each section which is 30° out of time phase with the magnetizing current in the preceding section and the magnetomotive forces will be equal in all of the sections.

Figure 4:
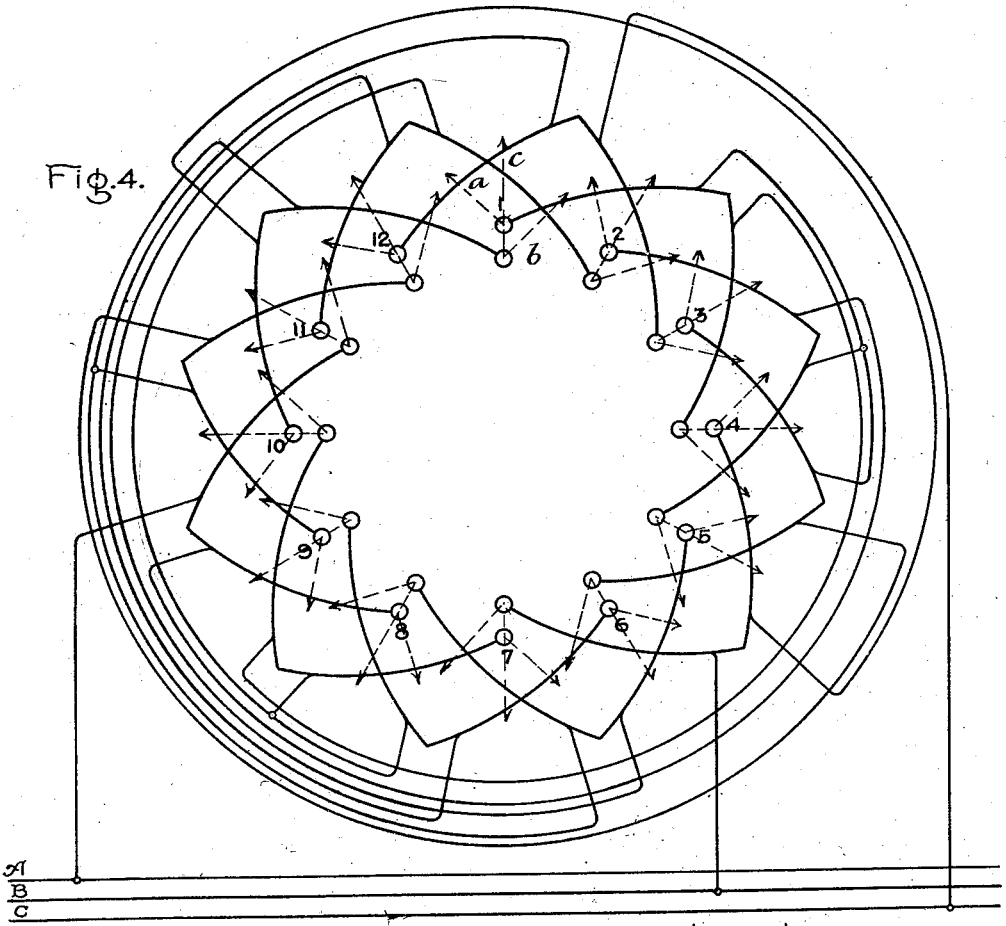

I have indicated in Fig. 4 by arrows drawn across the circles representing the coil sides the instantaneous vector values of the ampere turns in each of the coils. For example, the vector *a* drawn through the coil side designated 1 is ninety degrees out of phase with the vector *b* drawn through the other coil side occupying the same slot as 1, and the vector *c* which is the resultant of vectors *a* and *b* is on the radius passing through the slot.

The same results may be secured when the coils are connected to the supply conductors in the manner shown in Fig. 3, this arrangement being advantageous for lower supply voltage than the one shown in Fig. 2.

While I have illustrated a winding for a three-phase bipolar motor having twelve slots, it will of course be understood that my invention is equally well adapted to motors having more than two poles and that any number of slots may be used which is equal to 12 or a multiple of 12 for every two poles, the essential requirement being that there shall be an even number of slots per pole per phase.

What I claim as new and desire to secure by Letters Patent of the United States, is:—

1. In an alternating current motor a stator winding having an even number of coils per pole per phase, all of said coils being wound with a fractional pitch, every alternate coil being wound with n turns and the remaining coils being wound with 1.73n turns, and connections whereby the coils having n turns may be connected in Y between three-phase supply conductors, and the coils having 1.73n turns may be connected in delta.

2. In an alternating current motor a stator winding having an even number of coils per pole per phase, all of said coils being wound with a pitch of fifty per cent., every alternate coil being wound with n turns and the remaining coils being wound with 1.73n turns, and connections whereby the coils having n turns may be connected in Y between three phase supply conductors, and the coils having 1.73n turns may be connected in delta.

3. In an alternating current motor a stator winding divided into twelve sections per pair of poles with an equal number of coils in each section, all of said coils being wound with a fractional pitch, every alternate coil being wound with n turns and the remaining coils being wound with 1.73n turns, and connections whereby the sections whose coils have n turns may be connected in Y between three-phase supply conductors and the sections whose coils have 1.73n turns may be connected in delta.

4. In an alternating current motor a stator winding divided into twelve sections per pair of poles with an equal number of coils in each section, all of said coils being wound with a pitch of fifty per cent., every alternate coil being wound with n turns and the remaining coils being wound with 1.73n turns, and connections whereby the sections whose coils have n turns may be connected in Y between three phase supply conductors, and the sections whose coils have 1.73n turns may be connected in delta.

5. In an alternating current motor a stator winding divided into twelve sections per pair of poles with an equal number of coils in each section, all of said coils being wound with a fractional pitch, every alternate coil being wound with n turns and the remaining coils being wound with 1.73n turns, and connections whereby the sections whose coils have n turns may be connected in Y between three-phase supply conductors and the sections whose coils have 1.73n turns may be connected in delta, the connections being made in such a way that the magnetizing current in each section will be thirty degrees out of phase with the magnetizing current in a section adjacent thereto, and the magnetomotive forces will be equal in all of the sections.

6. In an alternating current motor a stator winding divided into twelve sections per pair of poles with an equal number of coils in each section, all of said coils being wound with a pitch of fifty per cent., every alternate coil being wound with n turns and the remaining coils being wound with 1.73n turns, and connections whereby the sections whose coils have $n$ turns may be connected in Y between three phase supply conductors and the sections whose coils have $1.73n$ turns may be connected in delta, the connections being made in such a way that the magnetizing current in each section will be 30 degrees out of phase with the magnetizing current in a section adjacent thereto, and the magnetomotive forces will be equal in all of the sections.

In witness whereof, I have hereunto set my hand this 15th day of March, 1916.

WILLEM C. KORTHALS-ALTES.

Copies of this patent may be obtained for five cents each, by addressing the "Commissioner of Patents, Washington, D. C."